(12) United States Patent
Sung

(10) Patent No.: US 7,817,207 B2
(45) Date of Patent: Oct. 19, 2010

(54) IMAGE SIGNAL PROCESSING DEVICE

(75) Inventor: Yu-Yu Sung, Cyonglin Township, Hsinchu County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1022 days.

(21) Appl. No.: 11/590,782

(22) Filed: Nov. 1, 2006

(65) Prior Publication Data

US 2007/0104328 A1 May 10, 2007

(30) Foreign Application Priority Data

Nov. 4, 2005 (TW) .............................. 94138835 A

(51) Int. Cl.
*H04N 7/00* (2006.01)
*H04N 5/06* (2006.01)
*H04N 5/04* (2006.01)

(52) U.S. Cl. .................... 348/464; 348/524; 348/540

(58) Field of Classification Search ............... 348/460, 348/464, 533, 521, 523, 524, 540, 500; 386/12, 386/13, 71, 84, 94, 119; 380/201, 274, 244, 380/204, 221; *H04N 7/00, 11/00, 5/06, 9/45, H04N 9/455, 5/05, 5/04*
See application file for complete search history.

(56) References Cited

U.S. PATENT DOCUMENTS

| 5,133,008 A | | 7/1992 | Fujita | 380/5 |
| 5,301,033 A | * | 4/1994 | Chon | 348/521 |
| 5,319,706 A | * | 6/1994 | Mizukata et al. | 348/533 |
| 5,337,157 A | | 8/1994 | Nakata | 358/335 |
| 5,596,372 A | * | 1/1997 | Berman et al. | 348/464 |

\* cited by examiner

*Primary Examiner*—Sherrie Hsia
(74) *Attorney, Agent, or Firm*—Bacon & Thomas, PLLC

(57) ABSTRACT

An image signal processing device, which uses a horizontal synchronizing signal detector to find a frequency (period) of an original horizontal synchronizing signal from an external input horizontal synchronizing signal and provide an internal reference horizontal synchronizing signal with the same frequency same as the original horizontal synchronizing signal to a horizontal synchronizing signal output controller for determining to output the external input horizontal synchronizing signal according to the frequency of the internal reference horizontal synchronizing signal and filtering out the original horizontal synchronizing signal.

18 Claims, 7 Drawing Sheets

FGI. 2 (PRIOR ART)

IMAGE SIGNAL PROCESSING DEVICE

BACKGROUND OF THE INVENTION

1. Field of the Invention

The invention relates to an image signal processing device and, more particularly, to an image signal processing device for processing an image signal or a video signal containing a copy guard signal.

2. Description of Related Art

For copy guard requirements, a copy guard signal is typically inserted in an image signal output by a video output device such as a VCD or DVD player to thereby avoid the image signal from directly copying by a video recorder.

FIG. 1 is a schematic diagram of an image signal 1 containing a copy guard signal 125. As shown in FIG. 1, the image signal 1 includes horizontal synchronizing signals 111, 112, and a vertical retrace blanking period 12. The vertical retrace blanking period 12 further includes equalized pulse signals 121, 122, a vertical synchronizing signal 123 and a horizontal synchronizing signal 124. The copy guard signal 125 is inserted in the horizontal synchronizing signal 124.

The image signal 1 containing the copy guard signal 125 can be broadcasted on a typical display device such as a CRT TV, but not on a digital display device such as an LCD TV. Namely, the broadcasted frames cannot be viewed on the LCD TV.

To overcome this, FIG. 2 shows a solution as provided by U.S. Pat. No. 5,133,008 granted to Fujita for an "Image Signal Processing Device". As shown in FIG. 2, the image signal processing device includes a horizontal synchronizing signal detector 21, a primary oscillator 22, a gate circuit 23, a counter 24 and an image signal processing circuit 25. As shown in FIG. 3, after vertical SYNC signals 31 are detected by the horizontal synchronizing signal detector 21, the counter 24 is reset and the primary oscillator 22 is triggered to produce a signal to indicate a coy guard signal generation section (referred to as an indicative signal 32), wherein the period of the indicative signal 32 is smaller than the vertical retrace blanking period 33. Meanwhile, the gate circuit 23 closes the output of horizontal SYNC signals for controlling the counter 24 not to count the number of the horizontal SYNC signals containing a coy guard signal. Namely, the gate circuit 23 outputs a replacing signal 34 to mask the horizontal SYNC signals containing the copy guard signal. An image signal can be viewed on a digital TV and thus the problem described above is solved.

Similarly, another solution is provided by U.S. Pat. No. 5,337,157 granted to Nakata for a "Copy Guard Processing Detecting Apparatus", which requires a counter to count the number of horizontal synchronizing signals in an entire frame and a non-vertical retrace blanking period respectively. Subsequently, the difference of the number of horizontal synchronizing signals between the entire frame and the non-vertical retrace blanking period is used to determine whether a copy guard signal presents or not.

However, the two solutions require the counter for counting the number of scan lines in a frame, and an indicator for indicating a section to be processed. Accordingly, pre-finding or detecting the format of an input image is required for accurately obtaining the vertical retrace blanking period and process thereof for accurately processing the subsequent operations, which requires lots of components and increases the design complexity.

Therefore, it is desirable to provide an improved device to mitigate and/or obviate the aforementioned problems.

SUMMARY OF THE INVENTION

An object of the invention is to provide an image signal processing device, which can prevent an abnormal frame output caused by inputting an image signal with a copy guard signal to a digital display device.

Another object of the invention is to provide simple design and low cost for an image signal processing device.

In accordance with one aspect of the invention, an image signal processing device is provided for processing an external input horizontal synchronizing signal with a copy guard signal. The image signal processing device includes a horizontal synchronizing signal detector and a horizontal synchronizing signal output controller. The horizontal synchronizing signal detector receives the external input horizontal synchronizing signal and an operating clock, detects the external input horizontal synchronizing signal, and outputs an internal reference horizontal synchronizing signal. The horizontal synchronizing signal output controller is electrical connected to the horizontal synchronizing signal detector and receives the operating clock, the externally input horizontal synchronizing signal and the internal reference horizontal synchronizing signal to thus filter an original horizontal synchronizing signal out of the externally input horizontal synchronizing signal according to a frequency of the internal reference horizontal synchronizing signal.

In accordance with another aspect of the invention, an image signal processing device is provided for processing an external input horizontal synchronizing signal with a copy guard signal. The image signal processing device includes a horizontal synchronizing signal detector and a horizontal synchronizing signal output controller. The horizontal synchronizing signal detector has a horizontal synchronizing signal extraction unit to find a period of an original horizontal synchronizing signal from the external input horizontal synchronizing signal, and a horizontal synchronizing signal reference output generator to receive the period of the original horizontal synchronizing signal and generate an internal reference horizontal synchronizing signal. The horizontal synchronizing signal output controller is electrically connected to the horizontal synchronizing signal detector and receives an operating clock, the external input horizontal synchronizing signal and the internal reference horizontal synchronizing signal to thus filter the original horizontal synchronizing signal out of the external input horizontal synchronizing signal according to the frequency of internal reference horizontal synchronizing signal.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
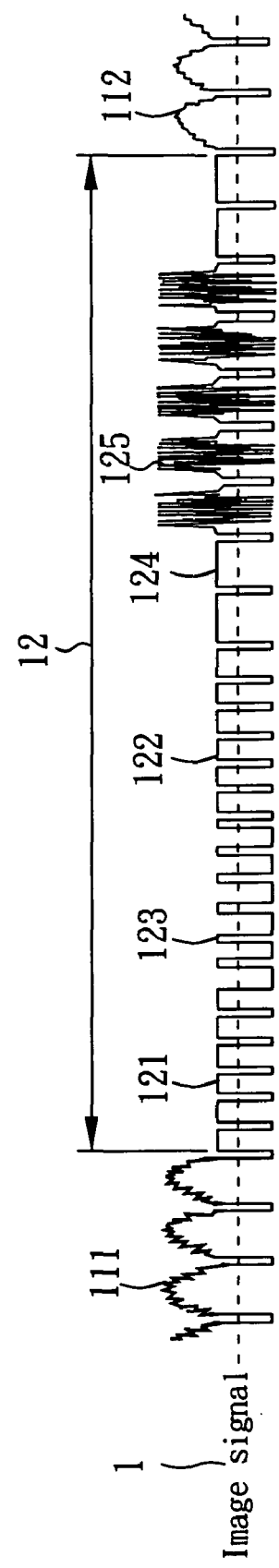
FIG. 1 is a schematic graph of a typical image signal containing a copy guard signal.
Figure 2:
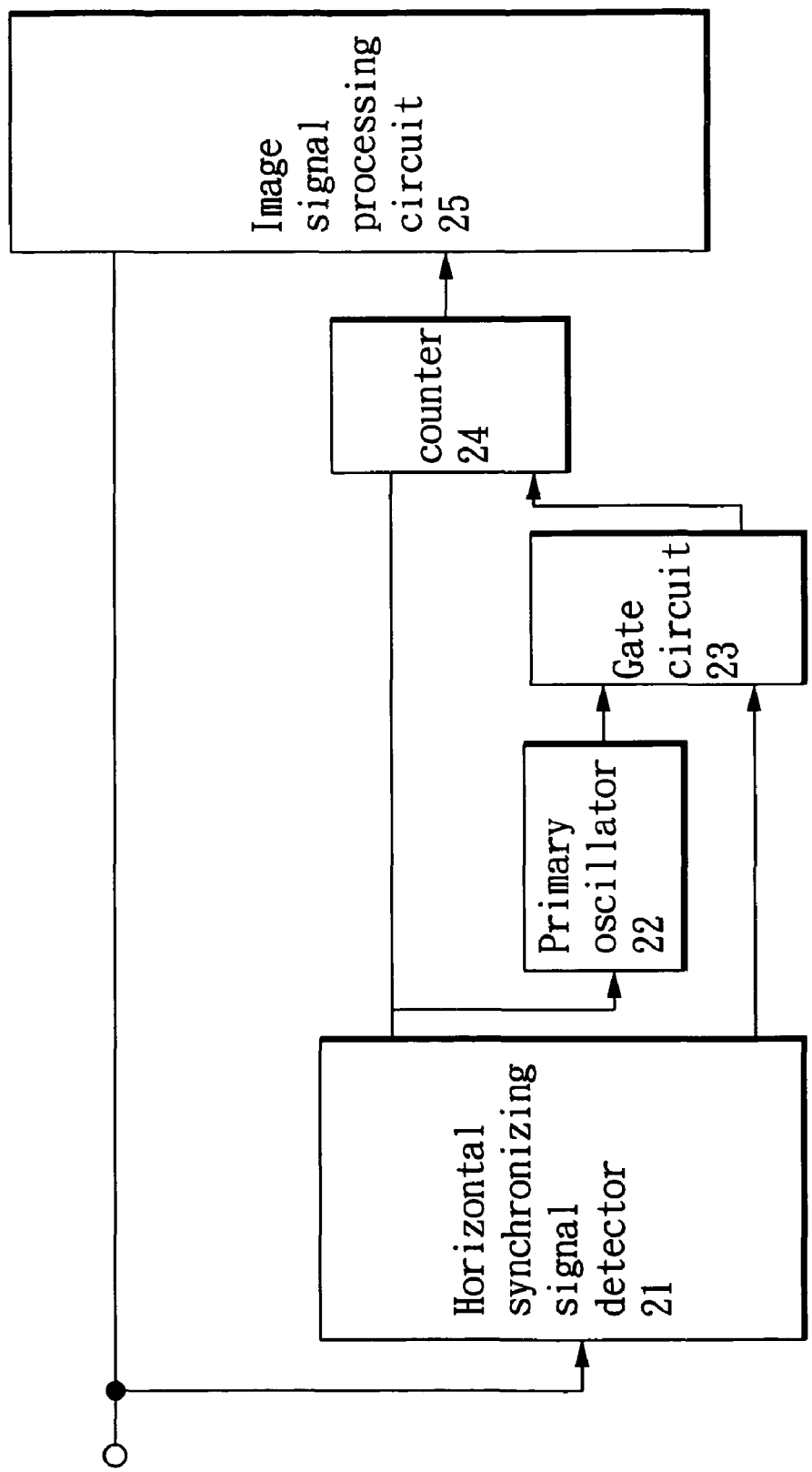
FIG. 2 is a block diagram of a typical image signal processing device.
Figure 3:
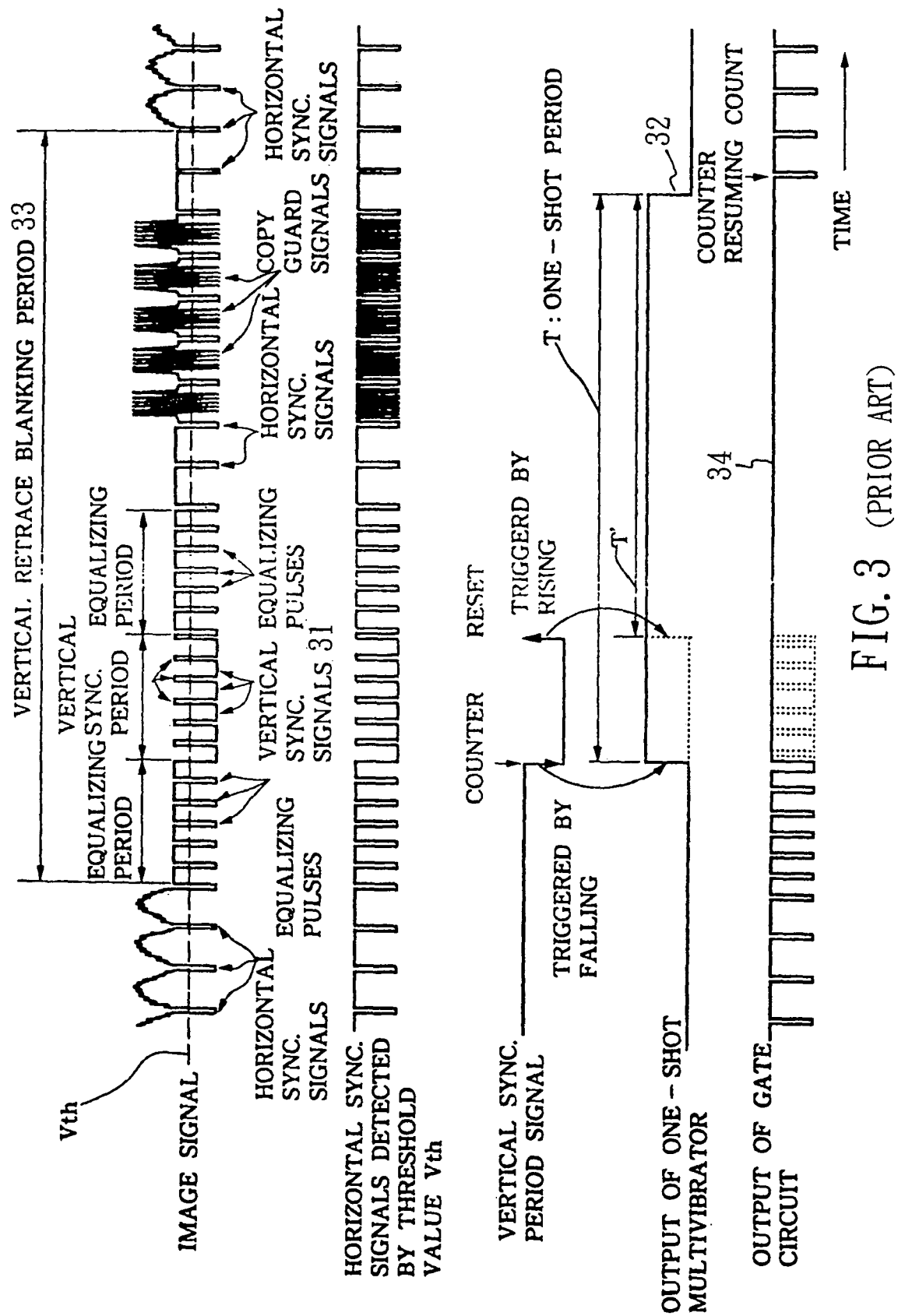
FIG. 3 is a schematic graph showing a typical image signal and detected horizontal synchronizing signals, and use of a replacing signal to mask horizontal synchronizing signals with a copy guard signal.
Figure 4:
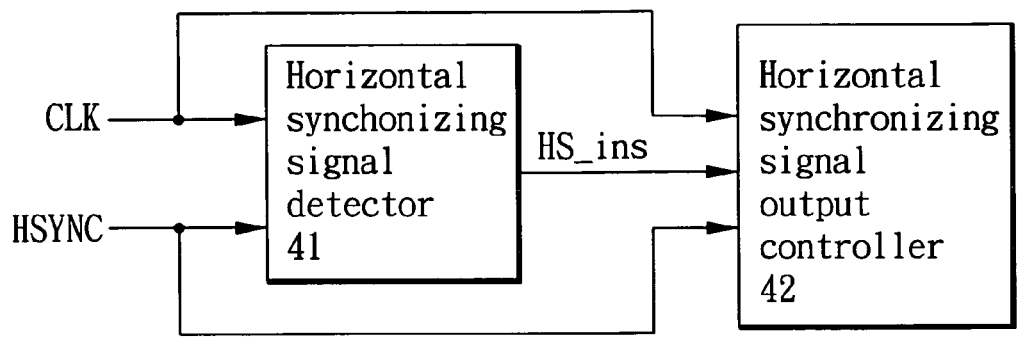
FIG. 4 is a block diagram of an image signal processing device according to a preferred embodiment of the invention.

FIG. 4 is a block diagram of an image signal processing device according to a preferred embodiment of the invention. In FIG. 4, the image signal processing device includes a horizontal synchronizing signal detector 41 and a horizontal synchronizing signal output controller 42 electrically connected to the horizontal synchronizing signal detector 41.

A frequency of horizontal synchronizing signal in an image signal is inconstant, especially in a period containing copy guard signal. The horizontal synchronizing signal in the period typically has a higher frequency. Accordingly, the horizontal synchronizing signal detector 41 receives an external input horizontal synchronizing signal HSYNC, which has original horizontal synchronizing signals and horizontal synchronizing signals containing a copy guard signal, and an operating clock CLK to thereby find a desired frequency of the original horizontal synchronizing signals from the signal HSYNC for a video display. Namely, the horizontal synchronizing signal detector 41 receives an image signal containing the copy guard signal and detects a frequency of an original horizontal synchronizing signal from the image signal to accordingly determine an internal reference horizontal synchronizing signal HS_ins which is the same as the original horizontal synchronizing signal detected.

The horizontal synchronizing signal detector 41 provides the internal reference horizontal synchronizing signal HS_ins to the horizontal synchronizing signal output controller 42. The horizontal synchronizing signal output controller 42 also receives the operating clock CLK and the signal HSYNC for filtering out the original horizontal synchronizing signal according to the frequency of the internal reference horizontal synchronizing signal HS_ins and outputting the original horizontal synchronizing signal filtered to other corresponding components, such as a phase-locked loop (PLL). Thus, the corresponding components can receive the original horizontal synchronizing signal filtered for further processing, regardless of the image signal containing the copy guard signal or not.

Figure 5:
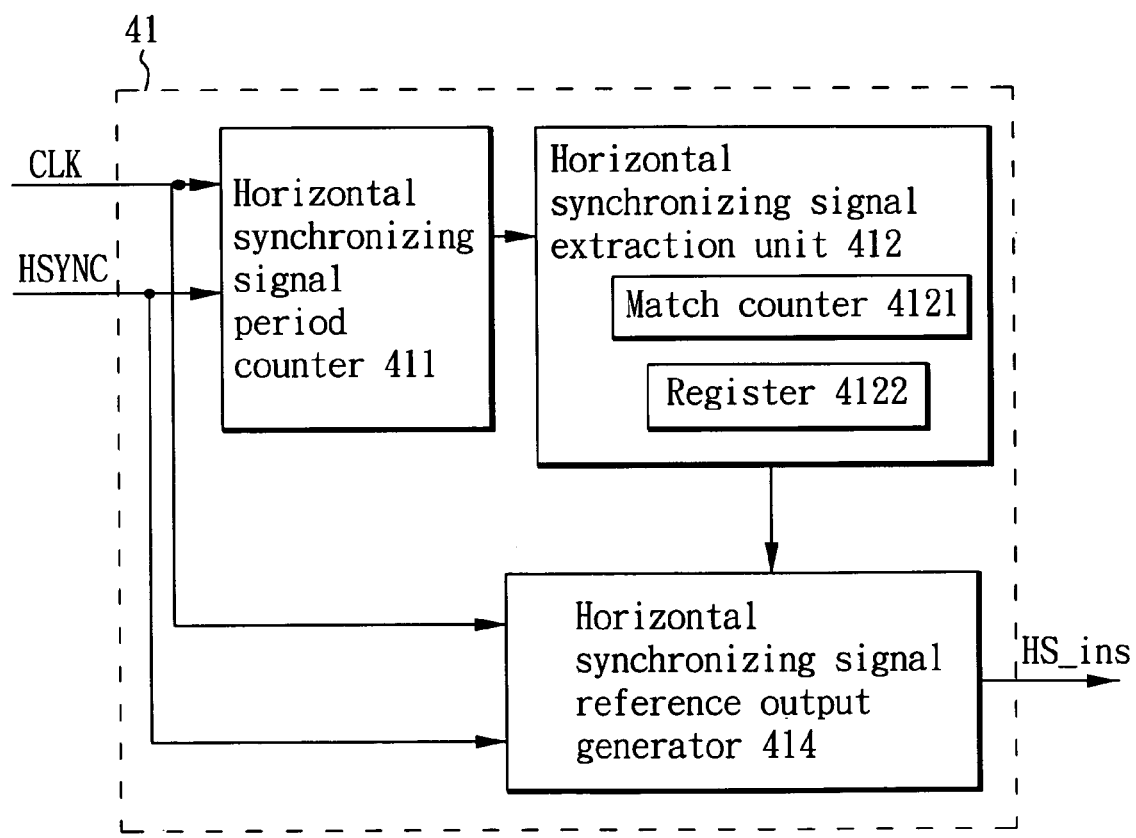
FIG. 5 is a block diagram of internal functions of a horizontal synchronizing signal detector according to a preferred embodiment of the invention.

FIG. 5 is a block diagram of internal functions of the horizontal synchronizing signal detector 41 according to a preferred embodiment of the invention. In FIG. 5, the detector 41 includes a horizontal synchronizing signal period counter 411, a horizontal synchronizing signal extraction unit 412 and a horizontal synchronizing signal reference output generator 414. The horizontal synchronizing signal extraction unit 412 has a match counter 4121 and a register 4122.

The horizontal synchronizing signal extraction unit 412 is electrically connected to the horizontal synchronizing signal period counter 411, and the horizontal synchronizing signal reference output generator 414 is electrically connected to the horizontal synchronizing signal extraction unit 412.

The horizontal synchronizing signal period counter 411 receives the operating clock CLK and the signal HSYNC containing the original horizontal synchronizing signals and the horizontal synchronizing signals with the copy guard signal. Thus, the horizontal synchronizing signal period counter 411 can count and find the period of each horizontal synchronizing signal according to the operating clock CLK to thereby send a result relating to periods to the horizontal synchronizing signal extraction unit 412.

Due to the frequency of an original horizontal synchronizing signal is stable in a video active region having a lot of original horizontal synchronizing signals, i.e., the number of which is far greater than that of the horizontal synchronizing signals containing the copy guard signal. Therefore, the horizontal synchronizing signal detector 41 can find an original horizontal synchronizing signal in a video active region according to the frequency of signal HSYNC. For example, if the frequency of signal HSYNC is greater than a predetermined value (for example 150), the frequency of the signal HSYNC is regarded as a frequency of the original horizontal synchronizing signal in the video active region.

In addition, the period of an original horizontal synchronizing signal is generally greater than the period of a horizontal synchronizing signal containing the copy guard signal. Accordingly, the horizontal synchronizing signal detector 41 provided in another embodiment of the invention can find a horizontal synchronizing signal with the greatest period from the signal HSYNC as the original horizontal synchronizing signal in the video active region.

Thus, the devices 411, 412, 4122 and 414 can implement the cited two embodiments, and the corresponding operations are further described as follows.

After finding the frequency of the original horizontal synchronizing signal, the horizontal synchronizing signal reference output generator 414 outputs a signal with the same frequency as the original horizontal synchronizing signal, which is referred to as the internal reference horizontal synchronizing signal HS_ins.

The following description is about the horizontal synchronizing signal detector 41 detects a frequency of the original horizontal synchronizing signal of the external input horizontal synchronizing signal HSYNC in different ways for providing the internal reference horizontal synchronizing signal HS_ins to the horizontal synchronizing signal output controller 42.

Figure 6:
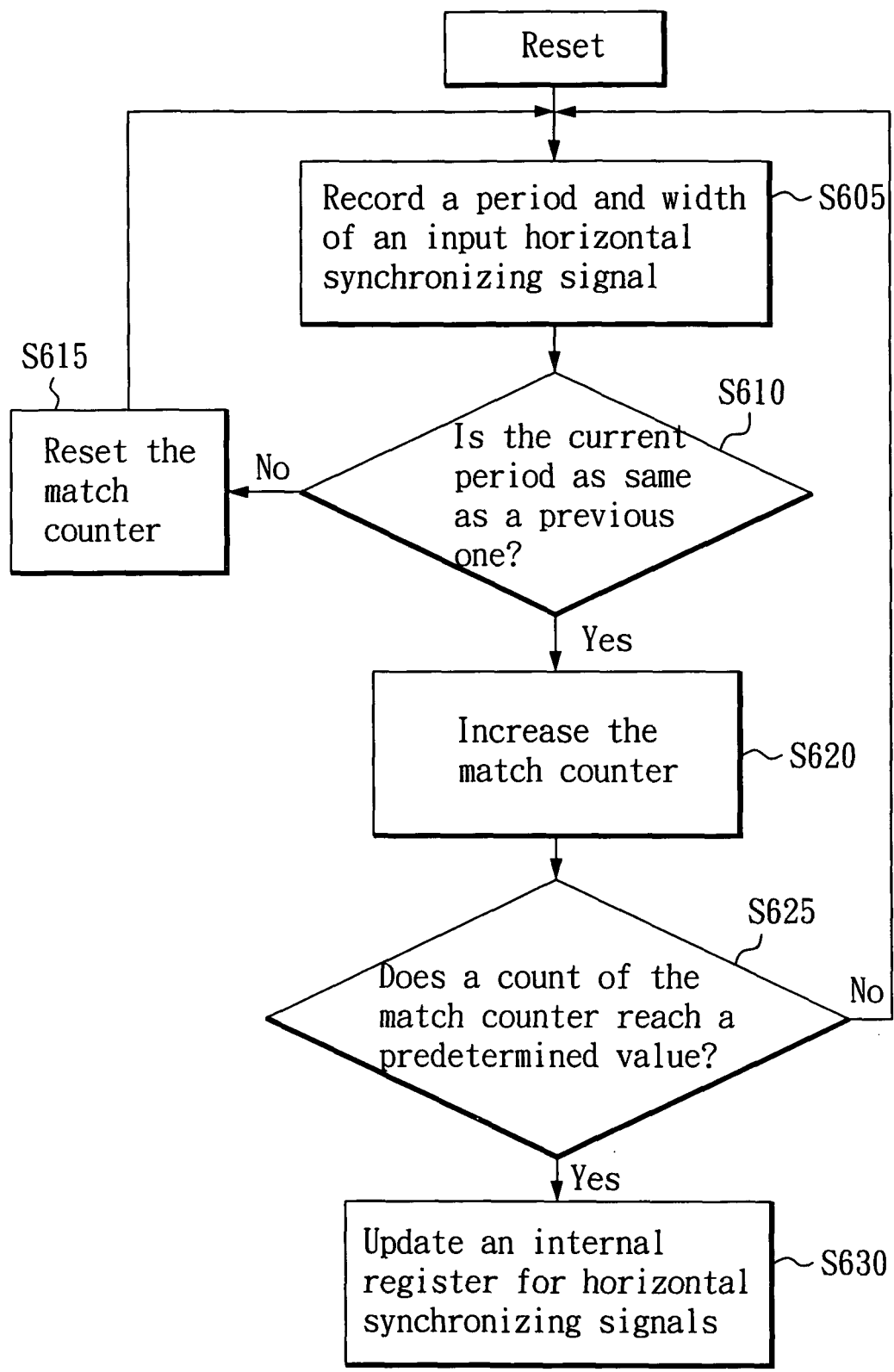
FIG. 6 is a flowchart of a first embodiment of using a horizontal synchronizing signal detector to provide an internal reference horizontal synchronizing signal according to a preferred embodiment of the invention.

FIG. 6 is a flowchart of a first embodiment of using the horizontal synchronizing signal detector 41 to provide an internal reference horizontal synchronizing signal. As shown in FIGS. 4 to 6, the horizontal synchronizing signal period counter 411 receives the signal HSYNC and counts the frequency (or period) of each horizontal synchronizing signal for outputting to the horizontal synchronizing signal extraction unit 412. In this embodiment, the horizontal synchronizing signal extraction unit 412 counts the external input horizontal synchronizing signal HSYNC to obtain the number of horizontal synchronizing signals that successively have a same period.

The horizontal synchronizing signal extraction unit 412 first receives a counting result output by the horizontal synchronizing signal period counter 411 and records the periods and widths of the horizontal synchronizing signals of the external input horizontal synchronizing signal (step S605).

The horizontal synchronizing signal extraction unit 412 compares the period and the width of a currently received horizontal synchronizing signal (such as the second one) with that of a previously stored one (such as the first one) and determines if the two horizontal synchronizing signals have the same period and width (step S610).

When the two horizontal synchronizing signals do not have the same period and width, the horizontal synchronizing signal extraction unit 412 outputs a reset signal to the match counter 4121 for resetting the counting result, and meanwhile the horizontal synchronizing signal extraction unit 412 temporarily stores the currently received horizontal synchronizing signal for being compared with a next received and recorded horizontal synchronizing signal.

Alternatively, if the two horizontal synchronizing signals have the same period and width, the horizontal synchronizing signal extraction unit 412 outputs an enable signal to the match counter 4121 for increasing the count by one (step S620), and meanwhile the horizontal synchronizing signal extraction unit 412 temporarily stores the currently received horizontal synchronizing signal for being compared with a next received and recorded horizontal synchronizing signal.

Next, the match counter 4121 determines if its count reaches a predetermined value, such as 150 (step S625). When the count of the match counter 4121 does not reach the predetermined value, the horizontal synchronizing signal extraction unit 412 continues to record and compare two successively received horizontal synchronizing signals. In other embodiments, the horizontal synchronizing signal extraction unit 412 can update the content of the register 4122 when the match counter 4121 has a count reaching another predetermined value or a predetermined time (such as a frame time).

When the count of the match counter 4121 reaches the predetermined value, the horizontal synchronizing signal extraction unit 412 uses the horizontal synchronizing signals that successively have a same period to update the register 4122 (step S630). Namely, the register 4122 stores the period (1/frequency) of horizontal synchronizing signal in the video active region.

Further, the horizontal synchronizing signal reference output generator 414 generates the internal reference horizontal synchronizing signal HS_ins based on the value temporarily stored in the register 4122.

As cited, the invention uses the horizontal synchronizing signal extraction unit 412 to count the number of horizontal synchronizing signals that successively have a same period in the external input horizontal synchronizing signal HSYNC for finding the frequency of horizontal synchronizing signal that is greater than a predetermined value, and the frequency of horizontal synchronizing signal is regarded as the frequency of the original horizontal synchronizing signal in the video active region.

Figure 7:
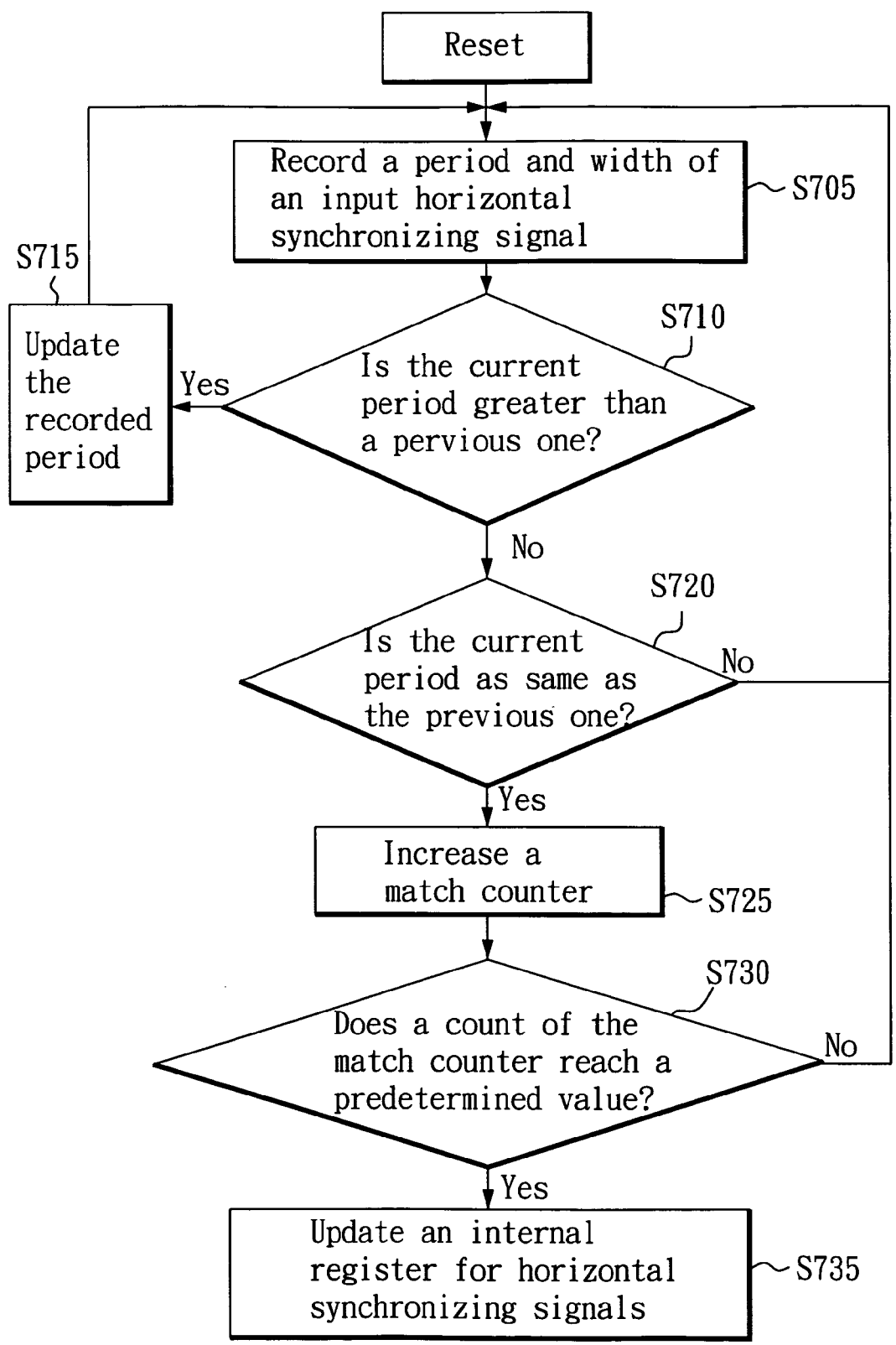
FIG. 7 is a flowchart of a second embodiment of using a horizontal synchronizing signal detector to provide an internal reference horizontal synchronizing signal according to a preferred embodiment of the invention.

FIG. 7 is a flowchart of a second embodiment of using the horizontal synchronizing signal detector 41 to provide the internal reference horizontal synchronizing signal. As shown in FIGS. 4, 5 and 7, the horizontal synchronizing signal period counter 411 receives an external input horizontal synchronizing signal HSYNC and finds the period of each horizontal synchronizing signal for outputting to the horizontal synchronizing signal extraction unit 412. In this embodiment, the horizontal synchronizing signal extraction unit 412 finds the greatest period of the horizontal synchronizing signal (i.e., the horizontal synchronizing signal with the smallest frequency) and temporarily stores the horizontal synchronizing signal with the greatest period.

However, in other embodiments, a vertical synchronizing signal (VSYNC) active region included in the external input horizontal synchronizing signal HSYNC can have some specific combinations to thus generate the horizontal synchronizing signal with the greatest period. Accordingly, the horizontal synchronizing signal extraction unit 412 can exclude the horizontal synchronizing signals in the VSYNC active region when finding the greatest period of the horizontal synchronizing signal.

The horizontal synchronizing signal extraction unit 412 compares the period of a currently received horizontal synchronizing signal (such as the second one) with that of a previously stored one (such as the first one) and determines if the period of the currently received horizontal synchronizing signal is greater than that of the previously recorded horizontal synchronizing signal (step S710).

When the period of the currently received horizontal synchronizing signal is greater than that of the previously recorded one, the horizontal synchronizing signal extraction unit 412 temporarily stores the currently received one for update, and step S705 is executed.

When the period of the currently received horizontal synchronizing signal is not greater than that of the previously recorded one, the horizontal synchronizing signal extraction unit 412 further determines if the currently received and the previously recorded horizontal synchronizing signals have the same period (step S720).

When the two horizontal synchronizing signals do not have the same period, step S705 is executed. When the two horizontal synchronizing signals have the same period, the horizontal synchronizing signal extraction unit 412 outputs an enable signal to the match counter 4121 for increasing the count by one (step S725).

Next, the match counter 4121 determines if its count reaches a predetermined value, such as 150 (step S730). When the count of the match counter 4121 does not reach the predetermined value, step S705 is executed.

When the count of the match counter 4121 reaches the predetermined value, the horizontal synchronizing signal extraction unit 412 uses the one with the greatest period to update the register 4122 (step S735), such that the value stored in the register 4122 can represent the period of a horizontal synchronizing signal in the video active region. Therefore, the match counter 4121 can be used to determine if the register is updated.

Further, the horizontal synchronizing signal reference output generator 414 generates the internal reference horizontal synchronizing signal HS_ins based on the value temporarily stored in the register 4122.

As cited, the invention finds a horizontal synchronizing signal with the greatest period, and the frequency of the horizontal synchronizing signal with the greatest period is regarded as the frequency of the original horizontal synchronizing signal in the video active region.

Next, the horizontal synchronizing signal detector 41 sends the signal HS_ins generated to the horizontal synchronizing signal output controller 42.

Figure 8:
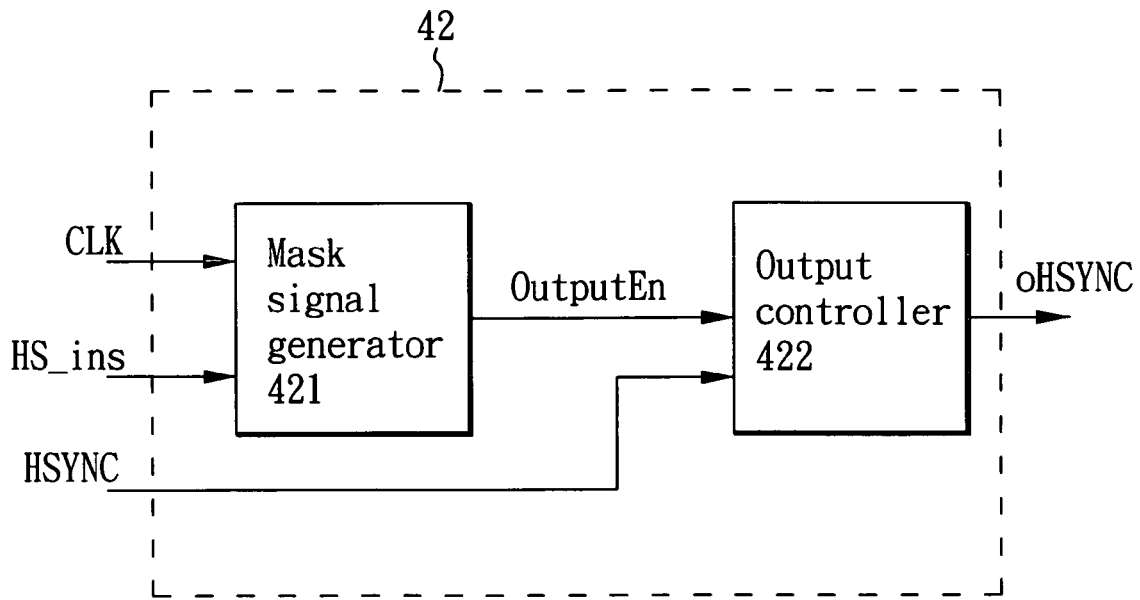
FIG. 8 is a block diagram of internal functions of a horizontal synchronizing signal output controller according to a preferred embodiment of the invention.

FIG. 8 is an internal functional block diagram of the horizontal synchronizing signal output controller 42, which includes a mask signal generator 421 and an output controller 422 electrically connected to the mask signal generator 421.

Figure 9:
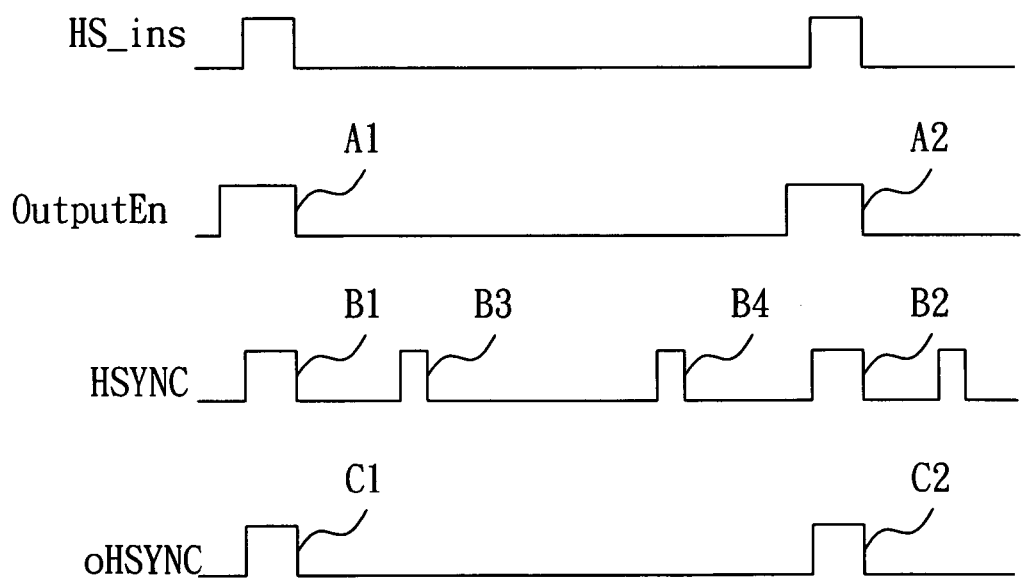
FIG. 9 is a timing of internal signals of a horizontal synchronizing signal output controller according to a preferred embodiment of the invention.

FIG. 9 shows a timing of internal signals of the horizontal synchronizing signal output controller 42. The following description is given by referring to FIGS. 8 and 9.

The mask signal generator 421 receives the internal reference horizontal synchronizing signal HS_ins and the operating clock CLK, and outputs an output enable signal OutputEn to the output controller 422. The output enable signal OutputEn and the internal reference horizontal synchronizing signal HS_ins have the same frequency.

In addition to receiving the output enable signal OutputEn, the output controller receives the externally input horizontal synchronizing signal HSYNC for processing according to the output enable signal OutputEn. Namely, based on an occurring frequency of the output enable signal OutputEn, the output controller 422 determines to output the external input horizontal synchronizing signal HSYNC for obtaining an original horizontal synchronizing signal oHSYNC.

For example, when the output enable signal OutputEn and the externally input horizontal synchronizing signal HSYNC are being received, and signals B1 and B2 of the externally input horizontal synchronizing signal HSYNC appear along with respective signals A1 and A2 of the output enable signal OutputEn, the output controller 422 outputs respective signals C1 and C2 of the original horizontal synchronizing signal oHSYNC. On the contrary, if the output enable signal OutputEn does not appear, the output controller 422 filters out received signals B3 and B4 of the external input horizontal synchronizing signal HSYNC, so as not to output the signals.

Accordingly, the horizontal synchronizing signal output controller 42 can obtain the original horizontal synchronizing signal oHSYNC and output it to the PLL or an image scalar device. Thus, a reference edge required by the PLL can be accurately found. Each signal contained in the original horizontal synchronizing signal oHSYNC can be processed separately by the output controller 422, and output respectively to the PLL or the image scalar device.

As cited, the invention uses the horizontal synchronizing signal detector to find a frequency of an original horizontal synchronizing signal from an external input horizontal synchronizing signal and provide an internal reference horizontal synchronizing signal as same frequency as the original horizontal synchronizing signal to the horizontal synchronizing signal output controller for processing the external input horizontal synchronizing signal according to the frequency of the internal reference horizontal synchronizing signal and filtering out the original horizontal synchronizing signal. Thus, the prior problem that an output frame is abnormal when an image signal with a copy guard signal is input to a digital display device is overcome.

Although the present invention has been explained in relation to its preferred embodiment, it is to be understood that many other possible modifications and variations can be made without departing from the spirit and scope of the invention as hereinafter claimed.

What is claimed is:

1. An image signal processing device for processing an external input horizontal synchronizing signal with a copy guard signal, comprising:
   a horizontal synchronizing signal detector, for receiving the external input horizontal synchronizing signal and an operating clock, detecting the external input horizontal synchronizing signal, and outputting an internal reference horizontal synchronizing signal, wherein the horizontal synchronizing signal detector comprises a horizontal synchronizing signal period counter for receiving the operating clock and the external input horizontal synchronizing signal for counting each period of horizontal synchronizing signals from the external input horizontal synchronizing signal according to the operating clock, a horizontal synchronizing signal extraction unit electrically connected to the horizontal synchronizing signal period counter, and a horizontal synchronizing signal reference output generator electrically connected to the horizontal synchronizing signal extraction unit; and
   a horizontal synchronizing signal output controller, which is electrically connected to the horizontal synchronizing signal detector, for receiving the operating clock, the external input horizontal synchronizing signal and the internal reference horizontal synchronizing signal to thus filter an original horizontal synchronizing signal out of the externally input horizontal synchronizing signal according to the frequency of internal reference horizontal synchronizing signal.

2. The device as claimed in claim 1, wherein the horizontal synchronizing signal extraction unit counts a number of horizontal synchronizing signals that successively have a same period in the external input horizontal synchronizing signal, and temporarily stores a value of the same period of the horizontal synchronizing signals when the number counted reaches a predetermined value.

3. The device as claimed in claim 2, wherein the horizontal synchronizing signal reference output generator receives the operating clock, the external input horizontal synchronizing signal and the value of the same period of the horizontal synchronizing signals for accordingly generating the internal reference horizontal synchronizing signal.

4. The device as claimed in claim 2, wherein the horizontal synchronizing signal extraction unit comprises a register for temporarily storing the value of the same period of the horizontal synchronizing signals, and a match counter for determining to update the register or not.

5. The device as claimed in claim 1, wherein the horizontal synchronizing signal extraction unit finds a horizontal synchronizing signal with greatest period, and temporarily stores a period of the horizontal synchronizing signal with greatest period.

6. The device as claimed in claim 5, wherein the external input horizontal synchronizing signal comprises a vertical synchronizing signal active region, and the horizontal synchronizing signal extraction unit excludes horizontal synchronizing signals in the vertical synchronizing signal active region when the horizontal synchronizing signal with greatest period is found by the horizontal synchronizing signal extraction unit.

7. The device as claimed in claim 5, wherein the horizontal synchronizing signal reference output generator receives the operating clock, the external input horizontal synchronizing signal and the period of the horizontal synchronizing signal with greatest period for accordingly generating the internal reference horizontal synchronizing signal.

8. The device as claimed in claim 5, wherein the horizontal synchronizing signal extraction unit comprises a register for temporarily storing the period of the horizontal synchronizing signal with greatest period, and a match counter for determining whether to update the register or not.

9. The device as claimed in claim 1, wherein the horizontal synchronizing signal output controller comprises:
   a mask signal generator for receiving the internal reference horizontal synchronizing signal and the operating clock for accordingly generating an output enable signal to an output controller; and
   the output controller, electrically connected to the mask signal generator, for receiving the output enable signal and the external input horizontal synchronizing signal for determining whether to output the external input horizontal synchronizing signal or not according to the frequency of output enable signal to obtain the original horizontal synchronizing signal.

10. An image signal processing device for processing an externally input horizontal synchronizing signal with a copy guard signal, comprising:

a horizontal synchronizing signal detector, which has a horizontal synchronizing signal extraction unit to find a period of an original horizontal synchronizing signal from the external input horizontal synchronizing signal, and a horizontal synchronizing signal reference output generator to receive the period of the original horizontal synchronizing signal and generate an internal reference horizontal synchronizing signal; and a horizontal synchronizing signal output controller, electrically connected to the horizontal synchronizing signal detector, receives an operating clock, the external input horizontal synchronizing signal and the internal reference horizontal synchronizing signal to filter the original horizontal synchronizing signal out of the externally input horizontal synchronizing signal according to the frequency of internal reference horizontal synchronizing signal.

11. The device as claimed in claim 10, wherein the horizontal synchronizing signal detector further comprises a horizontal synchronizing signal period counter, electrically connected to the horizontal synchronizing signal extraction unit, for receiving the operating clock and the external input horizontal synchronizing signal for counting each period of horizontal synchronizing signals from the external input horizontal synchronizing signal according to the operating clock.

12. The device as claimed in claim 10, wherein when a number of horizontal synchronizing signals that successively have a same period in the external input horizontal synchronizing signal reaches a predetermined value, the period of the original horizontal synchronizing signal is the same as the period of the horizontal synchronizing signals having the same period temporarily stored.

13. The device as claimed in claim 12, wherein the horizontal synchronizing signal reference output generator receives the operating clock, the external input horizontal synchronizing signal, and the period of the horizontal synchronizing signals having the same period for accordingly generating the internal reference horizontal synchronizing signal.

14. The device as claimed in claim 10, wherein the original horizontal synchronizing signal is a horizontal synchronizing signal with greatest period.

15. The device as claimed in claim 14, wherein the external input horizontal synchronizing signal comprises a vertical synchronizing signal active region, and the horizontal synchronizing signal extraction unit excludes horizontal synchronizing signals in the vertical synchronizing signal active region if the horizontal synchronizing signal with greatest period is found by the horizontal synchronizing signal extraction unit.

16. The device as claimed in claim 14, wherein the horizontal synchronizing signal reference output generator receives the operating clock, the external input horizontal synchronizing signal and the period of the horizontal synchronizing signal with greatest period for accordingly generating the internal reference horizontal synchronizing signal.

17. The device as claimed in claim 14, wherein the horizontal synchronizing signal extraction unit comprises a register for temporarily storing the period of the horizontal synchronizing signal with greatest period, and a match counter for determining whether to update the register or not.

18. The device as claimed in claim 10, wherein the horizontal synchronizing signal output controller comprises:

a mask signal generator for receiving the internal reference horizontal synchronizing signal and the operating clock for accordingly generating an output enable signal to an output controller; and the output controller, electrically connected to the mask signal generator, for receiving the output enable signal and the external input horizontal synchronizing signal for determining whether to output the external input horizontal synchronizing signal or not according to the frequency of output enable signal to obtain the original horizontal synchronizing signal.

* * * * *